(12) United States Patent
Huang et al.

(10) Patent No.: US 10,057,903 B2
(45) Date of Patent: Aug. 21, 2018

(54) METHOD AND APPARATUS FOR DETERMINING POWER OFFSET PARAMETERS

(71) Applicant: Huawei Technologies Co., Ltd., Shenzhen (CN)

(72) Inventors: Xin Huang, Shanghai (CN); Dingzhang Dai, Shanghai (CN); Jianyou Lin, Shenzhen (CN); Fangfu Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/604,478

(22) Filed: May 24, 2017

(65) Prior Publication Data

US 2017/0257869 A1 Sep. 7, 2017

Related U.S. Application Data

(63) Continuation of application No. 14/289,324, filed on May 28, 2014, now Pat. No. 9,686,797, which is a
(Continued)

(51) Int. Cl.
*H04W 72/04* (2009.01)
*H04W 52/14* (2009.01)
(Continued)

(52) U.S. Cl.
CPC ..... *H04W 72/0473* (2013.01); *H04W 52/146* (2013.01); *H04W 52/247* (2013.01);
(Continued)

(58) Field of Classification Search
None
See application file for complete search history.

(56) References Cited

U.S. PATENT DOCUMENTS

| 6,064,857 A | 5/2000 | Wiedeman |
| 7,106,700 B2 | 9/2006 | Freiberg |
| (Continued) | | |

FOREIGN PATENT DOCUMENTS

| CN | 1350730 A | 5/2002 |
| CN | 1697341 A | 11/2005 |
| (Continued) | | |

OTHER PUBLICATIONS

U.S. Appl. No. 14/289, 324, filed May 28, 2014.
U.S. Appl. No. 15/596,893, filed May 16, 2017.

*Primary Examiner* — Eunsook Choi
(74) *Attorney, Agent, or Firm* — Leydig, Voit & Mayer, Ltd.

(57) ABSTRACT

The present invention discloses a method and an apparatus for determining a power offset parameter. The method for determining the power offset parameter provided in the present invention comprises: obtaining data throughput rate and/or cell resource usage state of a terminal; determining a resource state of the terminal according to the data throughput rate and/or the cell resource usage state and a corresponding threshold; determining power offset parameter configuration corresponding to the resource state according to the determined resource state; and sending the power offset parameter configuration to the terminal, so that the terminal determines the power offset parameter according to the power offset parameter configuration.

15 Claims, 5 Drawing Sheets

Related U.S. Application Data continuation of application No. PCT/CN2011/083037, filed on Nov. 28, 2011.

(51) Int. Cl.
*H04W 52/24* (2009.01)
*H04W 52/26* (2009.01)
*H04W 52/34* (2009.01)
*H04W 52/36* (2009.01)
*H04W 52/58* (2009.01)

(52) U.S. Cl.
CPC ....... *H04W 52/267* (2013.01); *H04W 52/343* (2013.01); *H04W 52/362* (2013.01); *H04W 52/58* (2013.01)

(56) References Cited

U.S. PATENT DOCUMENTS

| | | |
|---|---|---|
| 2002/0077138 A1 | 6/2002 | Bark et al. |
| 2006/0234718 A1 | 10/2006 | Barrett et al. |
| 2007/0293260 A1 | 12/2007 | Xiao et al. |
| 2009/0196259 A1 | 8/2009 | Pani |
| 2010/0157895 A1 | 6/2010 | Pani |
| 2012/0238313 A1 | 9/2012 | Zhou et al. |
| 2015/0230140 A1 | 8/2015 | Pani |

FOREIGN PATENT DOCUMENTS

| | | |
|---|---|---|
| CN | 1774114 A | 5/2006 |
| CN | 1790939 A | 6/2006 |
| CN | 1823541 A | 8/2006 |
| CN | 101345988 A | 1/2009 |
| CN | 101473685 A | 7/2009 |
| CN | 101720123 A | 6/2010 |
| WO | 2010019091 A1 | 2/2010 |
| WO | 2011129730 A1 | 10/2011 |

# METHOD AND APPARATUS FOR DETERMINING POWER OFFSET PARAMETERS

CROSS-REFERENCE TO RELATED APPLICATIONS

This application is a continuation of U.S. patent application Ser. No. 14/289,324, filed on May 28, 2014, which is a continuation of International Patent Application No. PCT/CN2011/083037, filed on Nov. 28, 2011. All of the aforementioned patent applications are hereby incorporated by reference in their entireties.

FIELD OF THE INVENTION

Embodiments of the present invention relate to the field of communications, and in particular, to a method and an apparatus for determining a power offset parameter.

BACKGROUND OF THE INVENTION

High-speed uplink packet access (HSUPA, High-speed Uplink Packet Access) technologies are introduced into a wideband code division multiple access (WCDMA, Wideband Code Division Multiple Access) system and main characteristics of an HSUPA system include: 1. employing 10 ms/2 ms short frames; 2. employing a hybrid automatic repeat request HARQ (Hybrid Automatic Repeat reQuest) in a physical layer; and 3. implementing fast scheduling on a UE at a NodeB.

In the current HSUPA system, uplink multi-path search and channel estimation functions are mainly implemented relying on a DPCCH (Dedicated Physical Control Channel, dedicated physical control channel).

Actually, a power level of an uplink DPCCH channel is mainly decided by such parameters as transmission block size, target retransmission times, a reference E-DCH transport format combination indicator (E-TFCI, E-DCH Transport Format Combination Indicator) and a reference power offset of an enhanced-dedicated physical data channel (E-DPDCH, Enhanced-Dedicated Physical Data Channel) relative to DPCCH, an HARQ PO (PO is short for power offset) of each media access control-d (MAC-d, Media Access Control-d) flow, and the like. Because HSUPA supports variable speeds, all transmission blocks may be scheduled by a scheduling algorithm. In case of fixed target retransmission times, uplink DPCCH SIR levels corresponding to each transmission block at the moment are required closer to each other, in view of that speed of an outer loop power control (OLPC, Outer Loop Power Control) algorithm on adjusting a signal to interference ratio (SIR, Signal to Interference Ratio) target value is far slower than change of the transmission blocks. However, the uplink DPCCH SIR level of each transmission block is mainly determined by such parameters as the target retransmission times, the reference E-TFCI and the reference power offset of the E-DPDCH relative to the DPCCH, the HARQ PO for each MAC-d flow, and the like. In the case of fixedly configured target retransmission times, the reference offset of the E-DPDCH relative to the DPCCH and the HARQ PO for each MAC-d flow are also fixedly configured.

Based on the existing protocol architecture, the power level of the uplink DPCCH is relatively stable in the case that the reference E-TFCI, the reference power offset and the HARQ PO are fixedly configured; and the power level of the uplink DPCCH cannot balance an uplink higher speed data transmission state with an uplink low-speed data transmission state simultaneously in the case that the target retransmission times are fixed. It should be noted that, except a WCDMA system, other communication systems such as a Long Term Evolution system may also encounter similar problems.

SUMMARY OF THE INVENTION

Embodiments of the present invention provide a method and an apparatus for determining a power offset parameter, for dynamically determining power offset parameter configuration adaptive to a current network state of a terminal.

The method for determining a power offset parameter provided in the present invention includes: obtaining a data throughput rate and/or cell resource usage state of a terminal; determining power offset parameter configuration according to the data throughput rate and/or the cell resource usage state, and a corresponding threshold; and sending the power offset parameter configuration to the terminal, so that the terminal determines the power offset parameter according to the power offset parameter configuration.

Optionally, the obtaining cell resource usage state includes: obtaining uplink load or user count of at least one cell in serving cells of the terminal; and/or, obtaining uplink load or user count of at least one cell in active set cells of the terminal.

Optionally, the determining power offset parameter configuration according to the data throughput rate and/or the cell resource usage state, and a corresponding threshold comprises: determining a resource state of the terminal according to the data throughput rate and/or the cell resource usage state, and a corresponding threshold; determining the power offset parameter configuration corresponding to the resource state according to the determined resource state.

Optionally, the determining a resource state of the terminal according to the data throughput rate and/or the cell resource usage state, and a corresponding threshold includes:

determining a throughput rate state of the terminal according to the data throughput rate and a corresponding throughput threshold, where the throughput rate state includes at least one of a first throughput rate state and a second throughput rate state, where the first throughput rate state indicates that the data throughput rate is greater than or equal to a first throughput rate threshold, and the second throughput rate state indicates that the data throughput rate is smaller than or equal to a second throughput rate threshold; and the first throughput rate threshold is greater than or equal to the second throughput rate threshold; and/or determining a user count state or an uplink load state according to the cell resource usage state and the corresponding threshold, where the user count state includes at least one of a first user count state and a second user count state, where the first user count state indicates that the user count is greater than or equal to a first user count threshold, where the second user count state indicates that the user count is smaller than or equal to a second user count threshold, and the first user count threshold is greater than or equal to the second user count threshold; the uplink load state includes at least one of a first uplink load state and a second uplink load state, where the first uplink load state indicates that the uplink load is greater than or equal to a first uplink load threshold, and the second uplink load state indicates that the uplink load is smaller than or equal to a second uplink load threshold; and the first uplink load threshold is greater than or equal to the second uplink load threshold.

Optionally, the determining power offset parameter configuration corresponding to the resource state according to the determined resource state includes:

determining the power offset parameter configuration as low-speed parameter configuration if the data throughput rate of the terminal is in the first throughput rate state, where the low-speed parameter configuration is power parameter configuration with a data transmission rate lower than a data transmission rate threshold, a search path whose number is greater than a search path threshold and channel estimation precision greater than a channel estimation precision threshold; or, determining the power offset parameter configuration as high-speed parameter configuration if the data throughput rate of the terminal is in the second throughput rate state, where the high-speed parameter configuration is power parameter configuration with a data transmission rate higher than the data transmission rate threshold, a search path whose number is smaller than the search path threshold and channel estimation precision greater than the channel estimation precision threshold.

Optionally, the determining power offset parameter configuration corresponding to the resource state according to the determined resource state further includes:

determining the power offset parameter configuration as low-speed parameter configuration if the cell resource of a serving cell or at least one cell in active set cells of the terminal is in the first user count state or the first uplink load state, where the low-speed parameter configuration is power parameter configuration with a data transmission rate lower than the data transmission rate threshold, a search path whose number is greater than the search path threshold and channel estimation precision greater than the channel estimation precision threshold; or, determining the power offset parameter configuration as high-speed parameter configuration if the cell resource of the serving cell of the terminal is in the second user count state or the second uplink load state, where the high-speed parameter configuration is power parameter configuration with a data transmission rate higher than the data transmission rate threshold, a search path whose number is smaller than the search path threshold and channel estimation precision greater than the channel estimation precision threshold.

Optionally, the determining power offset parameter configuration corresponding to the resource state according to the determined resource state further includes:

determining the power offset parameter configuration as low-speed parameter configuration if the throughput rate of the terminal is in the second throughput rate state and the cell resource of a serving cell or at least one cell in active set cells of the terminal is in the first uplink load state, where the low-speed parameter configuration is power parameter configuration with a data transmission rate lower than the data transmission rate threshold, a search path whose number is greater than the search path threshold and channel estimation precision greater than the channel estimation precision threshold.

Optionally, the power offset parameter configuration includes:

a reference E-DCH transport format combination indicator E-TFCI and a reference power offset, and/or a hybrid automatic repeat request power offset HARQ PO of each media access control MAC-d flow.

After determining the power offset parameter configuration corresponding to the resource state, the method includes:

setting the reference E-TFCI and the reference power offset according to the determined power offset parameter configuration;

or, setting the HARQ PO for each MAC-d flow according to the determined power offset parameter configuration;

or, setting the reference E-TFCI, the reference power offset and the HARQ PO for each MAC-d flow according to the determined power offset parameter configuration.

Optionally, before determining the resource state of the terminal according to the data throughput rate and a preset threshold, the method includes: detecting that the data throughput rate on a data channel is changed.

The method for determining a power offset parameter provided in the present invention includes: receiving power offset parameter configuration sent by a radio network control device, where the power offset parameter configuration is determined by the radio network control device according to data throughput rate and/or cell resource usage state of a terminal, and a corresponding threshold; and setting the power offset parameter of the terminal according to the power offset parameter configuration.

Optionally, the power offset parameter configuration includes:

a reference E-TFCI and a reference power offset, or a hybrid automatic repeat request power offset HARQ PO for each MAC-d flow.

The setting the power offset parameter of the terminal according to the power offset parameter configuration includes:

setting the reference E-TFCI and the reference power offset according to the determined power offset parameter configuration;

or, setting the HARQ PO for each MAC-d flow according to the determined power offset parameter configuration;

or, setting the reference E-TFCI, the reference power offset and the HARQ PO for each MAC-d flow according to the determined power offset parameter configuration.

Optionally, the cell resource usage state includes: uplink load or user count of at least one cell in serving cells of the terminal; and/or uplink load or user count of at least one cell in active set cells of the terminal.

The radio network control device provided in the present invention includes: a resource obtaining unit, configured to obtain data throughput rate and/or cell resource usage state of a terminal; a configuration determining unit, configured to determine power offset parameter configuration corresponding to according to the data throughput rate and/or the cell resource usage state, and a corresponding threshold; and a configuration sending unit, configured to send the power offset parameter configuration to the terminal, so that the terminal determines the power offset parameter according to the power offset parameter configuration.

Optionally, the configuration determining unit includes:

a first state determining module, configured to determine a throughput rate state of the terminal according to the data throughput rate and a corresponding throughput rate threshold, where the throughput rate state includes at least one of a first throughput rate state and a second throughput rate state, where the first throughput rate state indicates that the data throughput rate is greater than or equal to the first throughput rate threshold, the second throughput rate state indicates that the data throughput rate is smaller than or equal to the second throughput rate threshold; and the first throughput rate threshold is greater than or equal to the second throughput rate threshold; and/or, a second state determining module, configured to determine a user count state or an uplink load state according to the cell resource usage state and a corresponding threshold, where the user count state includes at least one of a first user count state and a second user count state, where the first user count state indicates that user count is greater than or equal to a first user count threshold; the second user count state indicates that the user count is smaller than or equal to a second user count threshold, and the first user count threshold is greater than or equal to the second user count threshold; the uplink load state includes at least one of a first uplink load state and a second uplink load state, where the first uplink load state indicates that uplink load is greater than or equal to a first uplink load threshold, and the second uplink load state indicates that the uplink load is smaller than or equal to a second uplink load threshold; and the first uplink load threshold is greater than or equal to the second uplink load threshold.

Optionally, the configuration determining unit includes:

a first configuration determining module, configured to determine the power offset parameter configuration as low-speed parameter configuration if the data throughput rate of the terminal is in the first throughput rate state; or, determine the power offset parameter configuration as high-speed parameter configuration if the data throughput rate of the terminal is in the second throughput rate state; and/or, a second configuration determining module, configured to determine the power offset parameter configuration as low-speed parameter configuration if a cell resource of a serving cell or at least one cell in active set cells of the terminal is in the first user count state or the first uplink load state; or, determine the power offset parameter configuration as high-speed parameter configuration if a cell resource of a serving cell of the terminal is in the second user count state or the second uplink load state; and/or, a third configuration determining module, configured to determine the power offset parameter configuration as low-speed parameter configuration if the throughput rate of the terminal is in the second throughput rate state and a cell resource of the serving cell or the at least one cell in the active set cells of the terminal is in the first uplink load state.

The low-speed parameter configuration is power parameter configuration with a data transmission rate lower than a data transmission rate threshold, a search path whose number is greater than a search path threshold and channel estimation precision greater than a channel estimation precision threshold; and the high-speed parameter configuration is power parameter configuration with a data transmission rate higher than the data transmission rate threshold, a search path whose number is smaller than the search path threshold and channel estimation precision greater than the channel estimation precision threshold.

Optionally, the radio network control device further includes: a detecting unit, configured to detect whether data throughput rate on a data channel is changed and trigger the detecting unit if the data throughput rate is changed; and a parameter setting unit, configured to set a reference E-TFCI and a reference power offset according to the determined power offset parameter configuration; or, set an HARQ PO for each MAC-d flow according to the determined power offset parameter configuration; or, set a reference E-TFCI, a reference power offset and an HARQ PO for each MAC-d flow according to the determined power offset parameter configuration.

The terminal provided in the present invention includes: a configuration receiving unit, configured to receive power offset parameter configuration sent by a radio network control device, where the power offset parameter configuration is determined by the radio network control device according to data throughput rate and/or cell resource usage state of a terminal, and a corresponding threshold; and a setting unit, configured to set a power offset parameter of the terminal according to the power offset parameter configuration.

Optionally, the setting unit 802 may include:

a first setting module, configured to set a reference E-TFCI and a reference power offset according to the determined power offset parameter configuration;

and/or, a second setting module, configured to set an HARQ PO for each MAC-d flow according to the determined power offset parameter configuration.

Optionally, the cell resource usage state includes uplink load or user count of at least one cell in serving cells of the terminal, and/or, the uplink load or the user count of at least one cell in active set cells of the terminal.

It may be seen from the technical solutions that the embodiments of the present invention adjust, by determining in which throughput rate state the uplink data throughput rate of the terminal is, the power offset parameter configuration of the terminal into the power offset parameter configuration corresponding to a belonged throughput rate state, so that the terminal, in a scenario of different high and low-speed data throughput rate, may obtain power offset parameters adaptive to the scenario to implement optimal configuration of resources so as to maximum the uplink throughput rate.

DETAILED DESCRIPTION OF THE EMBODIMENTS

Embodiments of the present invention provide a method and an apparatus for determining a power offset parameter, for dynamically determining power offset parameter configuration adaptive to a current network state of a terminal.

Figure 1:
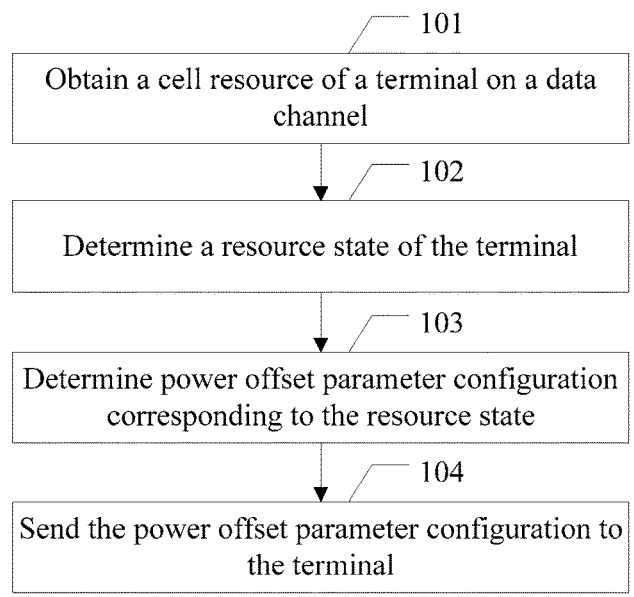
FIG. 1 is a schematic diagram of a method for determining a power offset parameter according to one embodiment of the present invention.

Referring to FIG. 1, a method for determining a power offset parameter according to one embodiment of the present invention includes:

101. Obtain data throughput rate of a terminal and/or cell resource usage state of a terminal.

In this embodiment, the data throughput rate and/or cell resource usage state of the terminal may be obtained by a radio network control device.

In practical application, the radio network control device in the embodiment of the present invention may be a radio network controller (RNC, Radio Network Controller) or an evolved NodeB, and is not limited here.

Optionally, the cell resource usage state may be user count or uplink load of at least one cell in serving cells of the terminal, and/or, uplink load or user count of at least one cell in active set cells of the terminal. That is, when a resource state of the terminal is determined according to the cell resource usage state, the user count or the uplink load of at least one cell of the serving cells of the terminal may be independently considered, or the uplink load or the user count of at least one cell in the active set cells of the terminal also may be independently considered, or the uplink load or the user count of at least one cell in the serving cells and the active set cells of the terminal may be integrally considered.

Specifically, the radio network control device may detect data usage of the terminal on a data channel (for example, an E-DPDCH channel) by using its own Radio Link Control (RLC, Radio Link Control) entity, and calculate the data throughput of the terminal on the data channel according to the data usage.

102. Determine the resource state of the terminal.

For example, the radio network control device may determine the resource state of the terminal according to the data throughput rate and/or cell resource usage state of the terminal, and a corresponding threshold.

Specifically, if the cell resource usage state is the user count of the cell, a preset threshold is user count threshold; if the cell resource usage state is the uplink load of the cell, the preset threshold is an uplink load threshold; and a preset threshold corresponding to the data throughput rate of the terminal may be called a throughput rate threshold. No matter to which types the cell resource usage state and the preset threshold belong, the resource state includes at least one type and the at least one type of resource state is corresponding to power offset parameter configuration of at least one level, respectively, so that the radio network control device selects power offset parameter configuration adaptive to a current resource state to implement data transmission.

The resource state may be determined separately according to the data throughput rate or the cell resource usage state of the terminal, or may be further determined integrally according to the data throughput rate and the cell resource usage state of the terminal.

103. Determine the power offset parameter configuration corresponding to the resource state.

The radio network control device determines the power offset parameter configuration corresponding to the resource state according to the determined resource state.

In the embodiments of the present invention, power offset parameter configuration corresponding to each resource state may be preset. Optionally, it is allowable to only preset one or two resource states or preset more resource states; in other word, multi-level power offset parameter configuration is set, so that the power offset parameter configuration is more precise.

After determining the power offset parameter configuration corresponding to the terminal, the radio network control device may set the power offset parameter of the terminal locally according to the power offset parameter configuration.

104. Send the power offset parameter configuration to the terminal.

The radio network control device sends the power offset parameter configuration to the terminal, so that the terminal determines the power offset parameter.

After the radio network control device determines the power offset parameter configuration currently adaptive to the terminal, the radio network control device may send the power offset parameter configuration to the terminal, so that the terminal may set the power offset parameter according to the power offset parameter configuration, and therefore implementing data transmission according to the power offset parameter.

Optionally, in step 104, the power offset parameter configuration may be sent to all terminals in the cell; if the data throughput rate of one terminal is obtained in step 101, the power offset parameter configuration is sent to the corresponding terminal in step 104.

In the present invention, the power offset parameter configuration of the terminal is adjusted to make it be the power offset parameter configuration corresponding to the resource state by determining the resource state of the terminal, so that the terminal may obtain, in a scenario of different resource states, the power offset parameter adaptive to the scenario to implement optimal configuration of resources.

Figure 2:
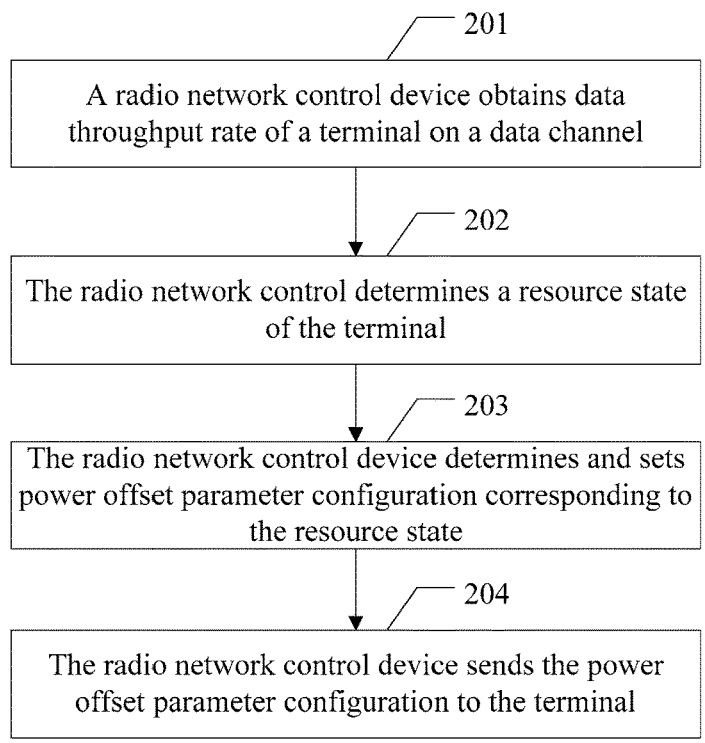
FIG. 2 is a schematic diagram of a method for determining a power offset parameter according to another embodiment of the present invention.

The following uses power offset parameter configuration of a terminal during data transmission as an example to illustrate a method for determining a power offset parameter of the present invention. Referring to FIG. 2, a method for a determining power offset parameter according to another embodiment of the present invention includes:

201. A radio network control device obtains data throughput rate of a terminal on a data channel.

In practical application, the radio network control device in the embodiment of the present invention may be an RNC or an evolved NodeB, and is not limited here.

Specifically, the radio network control device may perform entity detection on data usage of the terminal on the data channel (for example, an E-DPDCH channel) by its own RLC and calculate the data throughput rate of the terminal on the data channel according to the data usage.

202. The radio network control device determines a resource state of the terminal.

The radio network control device may determine the resource state of the terminal according to the data throughput rate of the terminal on the data channel and a preset threshold.

Specifically, the resource state may be shown as a throughput rate state when data transmission has occurred; moreover, there is at least one throughput rate state. For example, one throughput rate threshold (in other word, a preset threshold) may be set if impacts on the terminal caused by frequently adjusting power offset parameter configuration are not considered; therefore, two throughput rate states may be determined by the preset threshold. Certainly, it may be only determined whether the throughput rate is greater than a state of the threshold or smaller than the state of the threshold by one throughput rate threshold, which is not limited in this embodiment. If it needs to prevent frequent adjustments on the power offset parameter configuration, two throughput rate thresholds may be set; there are three throughput rate states accordingly. In this way, the data throughput rate of the terminal on the data channel may have a reciprocating buffer zone; in other word, the current power offset parameter configuration may not be adjusted when the data throughput rate is in a middle throughput rate state. Specifically, the throughput rate states may include a first throughput rate state, a second throughput rate state and a third throughput rate state, where the data throughput rate greater than or equal to a first throughput rate threshold belongs to the first throughput rate state; the data throughput rate between the first throughput rate threshold and a second throughput rate threshold (in other word, a threshold smaller than the first throughput rate threshold and greater than the second throughput rate threshold) belongs to the third throughput rate state; the data throughput rate smaller than or equal to the second throughput rate threshold belongs to the second throughput rate state; and the first throughput rate threshold is greater than the second throughput rate threshold. In the embodiment of the present invention, corresponding power offset parameter configuration is preset for each throughput rate state. Optionally, more throughput rate states may be preset for the terminal; that is, multi-level power offset parameter configuration is set, so that the power offset parameter configuration is more precise.

Optionally, the resource state of the terminal may be determined according to the cell resource usage state when data transmission has already occurred on the terminal. The cell resource usage state may be uplink load or user count of a serving cell or at least one cell in active set cells of the terminal. Specifically, the radio network control device may determine a user count state or an uplink load state according to the cell resource usage state and a corresponding threshold. The user count state includes at least one of a first user count state and a second user count state, where the first user count state indicates that user count is greater than or equal to a first user count threshold; the second user count state indicates that the user count is smaller than or equal to a second user count threshold, and the first user count threshold is greater than or equal to the second user count threshold.

The uplink load state includes at least one of a first uplink load state and a second uplink load state, where the first uplink load state indicates that uplink load is greater than or equal to a first uplink load threshold; the second uplink load state indicates that the uplink load is smaller than or equal to a second uplink load threshold; and the first uplink load threshold is greater than or equal to the second uplink load threshold.

203. The radio network control device determines and sets the power offset parameter configuration corresponding to the resource state.

The radio network control device determines the power offset parameter configuration corresponding to the resource state according to the determined resource state.

Specifically, the radio network control device determines the power offset parameter configuration according to a determination result of the throughput rate state. In the embodiment of the present invention, each throughput rate state is preset with corresponding power offset parameter configuration, where the power offset parameter configuration may include specific parameter content (for example, an E-TFCI and a reference power offset) and configuration of the power content, or may include a policy of a set of configuration (for example: keeping the current parameter unchanged). Like the first throughput rate state, values of the data throughput rate in the first throughput rate state are higher throughput rate. If the data throughput rate of the terminal on the data channel is in the first throughput rate state, a power offset parameter with lower speed may be configured for the terminal, so that the terminal may obtain higher multi-path search and channel estimation precisions, and therefore obtain optimal uplink high-speed data transmission performance.

After determining the power offset parameter configuration corresponding to the terminal, the radio network control device sets the power offset parameter of the terminal locally according to the power offset parameter configuration.

Optionally, if the data throughput rate obtained in step 201 is average data throughput rate of all the terminals in one cell, the power offset parameter set in step 203 is a power offset parameter of all the terminals in the cell. If the data throughput obtained in step 201 is the data throughput rate of one terminal, the power offset parameter set in step 203 is a power offset parameter of the corresponding terminal.

Optionally, if the resource state of the terminal is determined according to the cell resource usage state, the power offset parameter configuration is determined as low-speed parameter configuration if the cell resource of the serving cell or the at least one cell in the active set cells of the terminal is in the first user count state or the first uplink load state; where the low-speed parameter configuration is parameter configuration with a lower data transmission rate, a greater search path and a higher channel estimation precision. Or, the power offset parameter configuration is determined as high-speed parameter configuration if the resource of the serving cell of the terminal is in the second user count state or the second uplink load state; where the high-speed parameter configuration is parameter configuration with a higher data transmission rate, a greater search path and a lower channel estimation precision. Understandably, a data transmission rate threshold, a search path threshold and channel estimation precision threshold exist in practical application and values of the thresholds may be set according to an actual requirement. This is not limited in the embodiment of the present invention. The smaller or greater (more or less) is relative to the values of the thresholds. For example, the higher data transmission rate may refer to that the data transmission rate is greater than the data transmission rate threshold. In the same way, descriptions of smaller or greater (more or less) in the search path and the channel estimation precision also have similar meanings. Unnecessary details are not described here.

204. The radio network control device sends the power offset parameter configuration to the terminal.

The radio network control device sends the power offset parameter configuration to the terminal, so that the terminal determines the power offset parameter.

After the radio network control device determines power offset parameter configuration currently adaptive to the terminal, the radio network control device may send the power offset parameter configuration to the terminal, so that the terminal may set the power offset parameter according to the power offset parameter configuration, thereby implementing data transmission according to the power offset parameter.

Figure 3:
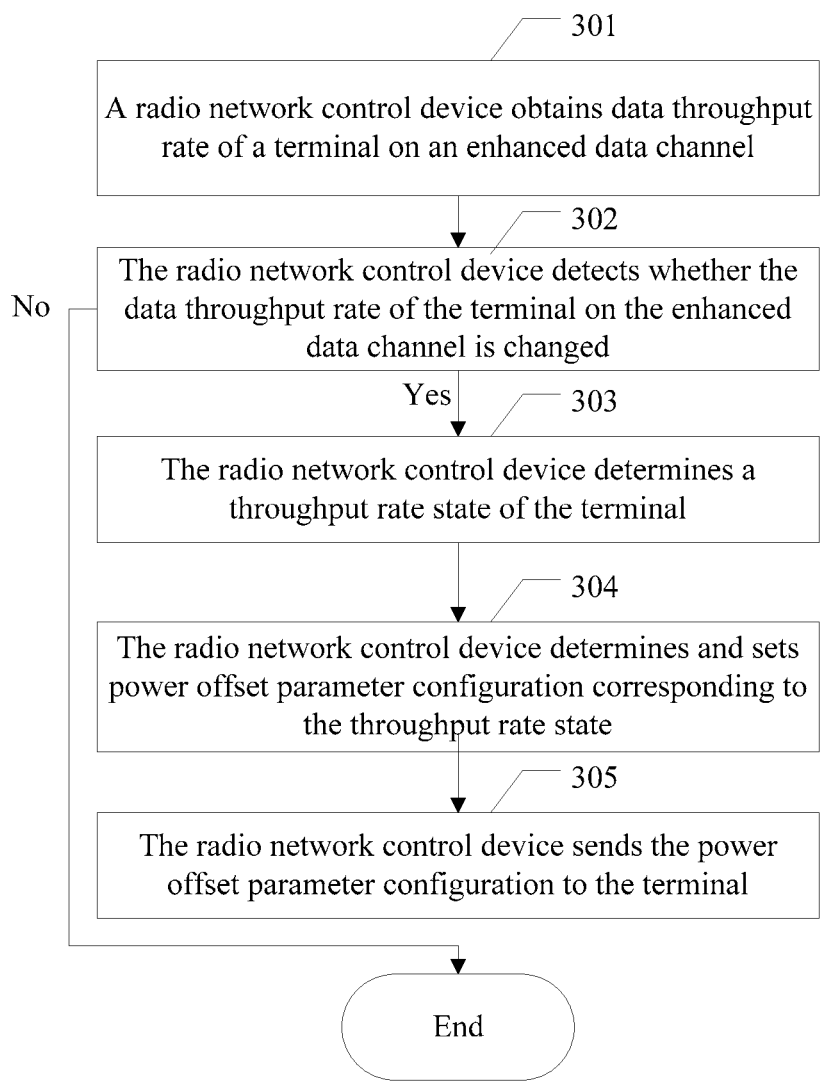
FIG. 3 is a schematic diagram of a method for determining a power offset parameter according to another embodiment of the present invention.

To help understanding, the embodiment is described in detail by using a specific application scenario. Referring to FIG. 3, a method for determining a power offset parameter according to another embodiment of the present invention includes:

301. A radio network control device obtains data throughput rate of a terminal on an enhanced data channel.

The radio network control device obtains the data throughput rate of the terminal on the data channel (for example, E-DPDCH).

In the embodiment of the present invention, the radio network control device may obtain the data throughput rate of the terminal on the data channel according to data usage of the terminal on the data channel in a preset time period T. For example, the data throughput rate is equal to the data usage which is obtained by dividing total data usage on the data channel in a preset time period T by the preset time period T. Understandably, the data throughput rate may be updated periodically. That is, the data throughput rate in a next preset time period T may be different from the data throughput rate in a previous preset time period T. However, if the data throughput rate is not changed, the power offset parameter of the terminal may be kept unchanged all the time. That is, step 302 may be performed before to which state the data throughput rate belongs is determined.

302. The radio network control device detects whether the data throughput rate of the terminal on the enhanced data channel is changed.

In the embodiment of the present invention, the radio network control device may detect whether the data throughput rate in the current preset time period T is changed when being compared with the data throughput rate in the previous preset time period T. If the data throughput rate is changed, subsequent step 303 is triggered; if the data throughput rate is not changed, a process of setting the power offset parameter may be stopped.

303. The radio network control device determines a throughput rate state of the terminal.

The radio network control device may determine the throughput rate state of the terminal according to the data throughput rate of the terminal on the data channel and a preset threshold.

In the embodiment of the present invention, in view of impacts on the transmission speed of the terminal, three throughput rate states and power offset parameter configuration at two levels (high-speed parameter configuration and low-speed parameter configuration) may be set, where the three throughput rate states are a first throughput rate state, a second throughput rate state and a third throughput rate state, respectively; where the data throughput rate greater than or equal to a first throughput rate threshold belongs to the first throughput rate state; the data throughput rate between the first throughput rate threshold and a second throughput rate threshold (in other word, a threshold smaller than the first throughput rate threshold and greater than the second throughput rate threshold) belongs to the third throughput rate state; and the data throughput rate smaller than or equal to the second throughput rate threshold belongs to the second throughput rate state. The first throughput rate threshold is greater than the second throughput rate threshold; that is, the first throughput rate state is an interval corresponding to the high-speed parameter configuration. The third throughput rate state is a buffer interval; that is, when the data throughput rate is smaller than the first throughput rate threshold and greater than the second throughput rate threshold, the data throughput rate may be considered as a reasonable speed fluctuation. In this interval, the current power offset parameter configuration may be kept unchanged; while the second throughput rate state is an interval corresponding to the low-speed parameter configuration.

304. The radio network control device determines and sets the power offset parameter configuration corresponding to the throughput rate state.

The radio network control device determines the power offset parameter configuration corresponding to the throughput rate state according to the determined throughput rate state.

The radio network control device sets a power offset parameter configuration corresponding to a local terminal into the power offset parameter configuration corresponding to the throughput rate state according to a determining result of the throughput rate state, where each throughput rate state may be preset with a corresponding power offset configuration parameter.

Optionally, if the data throughput rate belongs to the first throughput rate state, the power offset parameter configuration of the terminal is adjusted to make it be low-speed parameter configuration; therefore, power load occupied by DPCCH will be reduced; at this moment, more power load may be used by the data channel, and data transmission performance may be improved by a certain extent. If the data throughput rate belongs to the third throughput rate state, the current power offset parameter configuration may be kept unchanged; that is, the current power offset parameter configuration may be adaptive to the current transmission scenario. If the data throughput rate belongs to the second throughput rate state, the power offset parameter configuration of the terminal is adjusted to make it be a high-speed parameter configuration, so that a throughput of a HSUPA cell of a HSUPA terminal may be improved.

The adjusted power offset parameter configuration not only may be a reference E-TFCI and a reference power offset parameter configured for the terminal, but also may be an HARQ PO configured for each MAC-d flow. Because no matter which type of power offset is adjusted, a power offset corresponding to each transmission block at a terminal device end may be changed. The reference E-TFCI and the reference power offset may be dynamically adjusted if the HARQ PO configured for each MAC-d flow is different before the present invention is applied.

Optionally, in the embodiment of the present invention, initial power offset parameter configuration of the terminal may be preconfigured into high-speed parameter configuration or low-speed parameter configuration according to actual situations. Specifically, one power offset parameter configuration may be selected by the radio network control device self-adaptively according to a congestion state of the uplink load; if the load is congested or more users are accessed, the radio network control device automatically selects low-speed parameter configuration for the terminal so as to reduce load occupancy of the terminal; conversely, high-speed parameter configuration is selected.

Specific content of the power offset parameter configuration may include: such parameters as the reference E-TFCI and the reference power offset (the power offset of an E-DPDCH relative to a DPCCH), and/or the HARQ PO for each MAC-d flow, and the like.

Specifically:

(1) configuration of a reference E-TFCI and reference power offset may be unchanged, and configuration of an HARQ PO may be adjusted; for example, the HARQ PO is configured to 5 dB in low-speed parameter configuration; and the HARQ PO is configured to 0 dB in high-speed parameter configuration;

(2) or, the HARQ PO may be unchanged, and the configuration of the reference E-TFCI and the reference PO may be adjusted; for example, the HARQ PO is always set as 0 dB; however, in the high-speed parameter configuration, the reference E-TFCI and the reference PO are:

| Reference E-TFCI | Reference PO |
|---|---|
| 1 | 11 |
| 3 | 13 |
| . . . | . . . |

The configuration of the E-TFCI and the reference PO may be configuration with only one group of numbers such as "1" and "11", and may be further configuration with a plurality of groups of numbers which are represented by ellipsis here and is not described again.

However, the configuration of the E-TFCI and the reference PO in the low-speed parameter configuration is:

| Reference E-TFCI | Reference PO |
|---|---|
| 1 | 16 |
| 3 | 18 |
| . . . | . . . |

(3) All the configuration of the reference E-TFCI, the reference PO and the HARQ PO may be adjusted. Assume that initial configuration of (1) and (2) is high-speed parameter configuration, then the configuration of the reference E-TFCI and the reference PO in the low-speed parameter configuration is:

| Reference E-TFCI | Reference PO |
|---|---|
| 1 | 16 |
| 3 | 18 |
| . . . | . . . |

Moreover, HARQ PO=3 dB.

305. The radio network control device sends the power offset parameter configuration to the terminal.

The radio network control device sends the power offset parameter configuration to the terminal, so that the terminal determines the power offset parameter.

After the radio network control device determines the power offset parameter configuration currently adaptive to the terminal, the radio network control device sends the power offset parameter configuration to the terminal, so that the terminal may set the power offset parameter according to the power offset parameter configuration, thereby implementing data transmission according to the power offset parameter. For a specific way for setting the power offset parameter of the terminal, reference may be made to content described in step 304; and unnecessary details are not described here.

Application scenarios in the embodiments of the present invention are only described above by some examples. Understandably, more application scenarios may exist in practical application, which is not limited here.

It should be noted that an event trigger mechanism is adopted for configuring the power offset parameter of the embodiment of the present invention. Optionally, a periodical mechanism may be further adopted by the present invention; that is, the step of determining to which throughput rate state the current data throughput rate belongs is triggered in each preset time slot. The specific way to be adopted depends on practical situations, which is not limited here.

Figure 4:
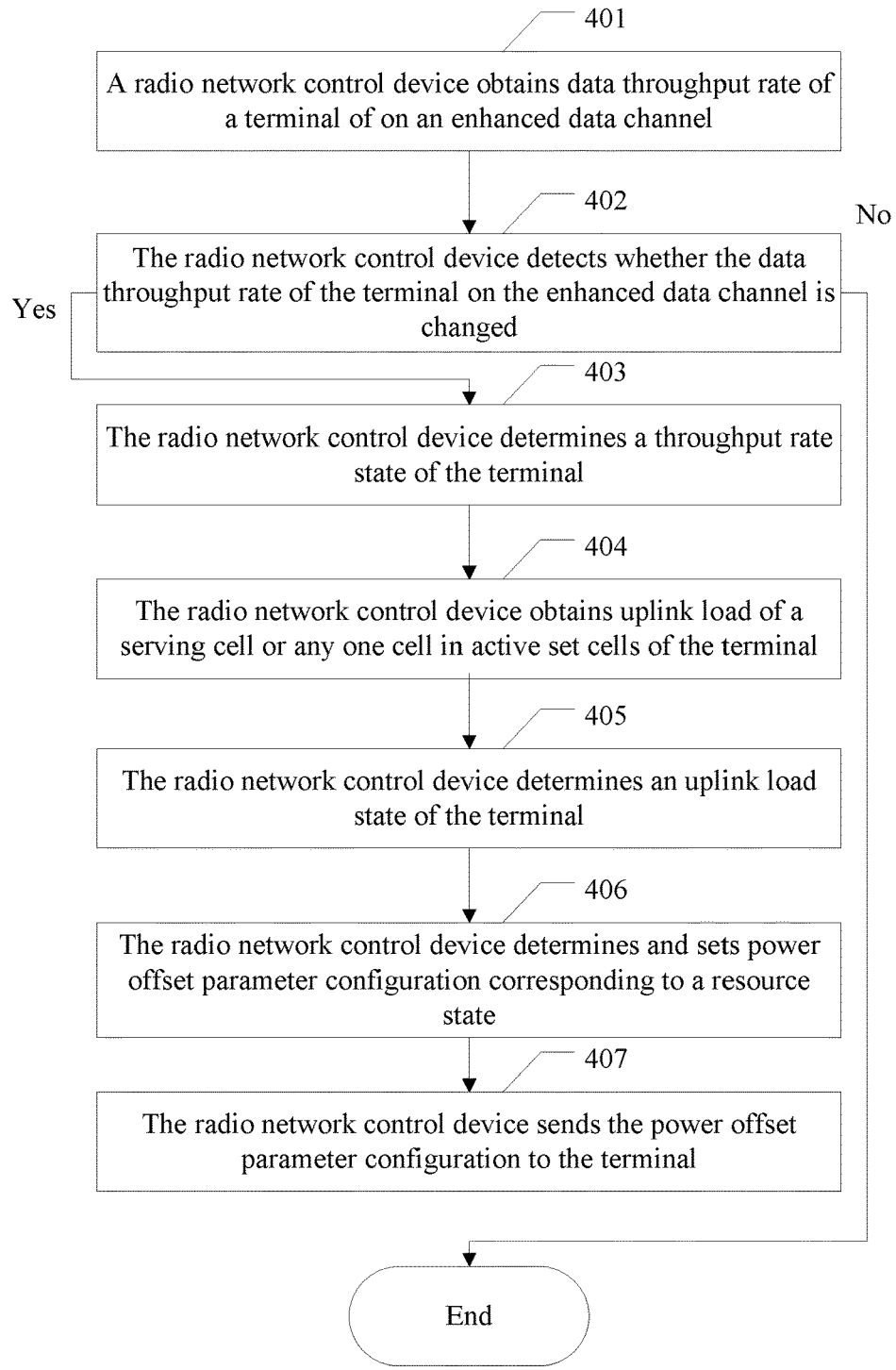
FIG. 4 is a schematic diagram of a method for determining a power offset parameter according to another embodiment of the present invention.

Because the data throughput rate of the terminal on the data channel may fluctuate, in order to prevent the "Ping Pang" problem on adjusting the power offset parameter, in other word, to frequently switch the power offset parameter, the present invention further proposes corresponding technical solutions. Referring to FIG. 4, a method for determining power offset parameter according to another embodiment of the present invention includes:

401. A radio network control device obtains data throughput rate of a terminal on an enhanced data channel.

The radio network control device obtains the data throughput rate of the terminal on an E-DPDCH.

In the embodiment of the present invention, the radio network control device may obtain the data throughput rate of the terminal on the data channel according to data usage of the terminal on the data channel in a preset time period T; for example, the data throughput rate is equal to the data usage which is obtained by dividing total data usage on the data channel in the preset time period T by the preset time period T. Understandably, the data throughput rate may be updated periodically; that is, the data throughput rate in a next preset time period T may be different from the data throughput rate in the previous preset time period T. However, if the data throughput rate is not changed, the power offset parameter of the terminal may be kept unchanged all the time. That is, step 402 may be performed before to which state the data throughput rate belongs is determined.

402. The radio network control device detects whether the data throughput rate of the terminal on the enhanced data channel is changed.

In the embodiment of the present invention, the radio network control device may detect whether the data throughput rate in the current preset time period T is changed when being compared with the data throughput rate in the previous preset time period T. If the data throughput rate is changed, a subsequent step 403 is triggered; if the data throughput rate is not changed, a process of setting the power offset parameter may be stopped.

403. The radio network control device determines a throughput rate state of the terminal.

The radio network control device may determine the throughput rate state of the terminal according to the data throughput rate of the terminal on the data channel and a preset threshold.

In the embodiment of the present invention, in view of impacts on the transmission speed of the terminal, three throughput rate states and power offset parameter configuration at two levels (high-speed parameter configuration and low-speed parameter configuration) may be set, where the three throughput rate states are a first throughput rate state, a second throughput rate state and a third throughput rate state, respectively; where the data throughput rate greater than or equal to a first throughput rate threshold belongs to the first throughput rate state; the data throughput rate between the first throughput rate threshold and a second throughput rate threshold (in other word, a threshold smaller than the first throughput rate threshold and greater than the second throughput rate threshold) belongs to the third throughput rate state; and the data throughput rate smaller than or equal to the second throughput rate threshold belongs to the second throughput rate state.

Step 404 may be triggered firstly if the data throughput rate of the terminal on the data channel belongs to the second throughput rate state; and step 406 may be performed directly if the data throughput rate of the terminal on the data channel belongs to the first throughput rate state or the third throughput rate state.

404. The radio network control device obtains uplink load of a serving cell or at least one cell in active set cells of the terminal.

Here, it may be that the radio network control device obtains uplink load terminal of the serving cell or the at least one cell in the active set cells of the terminal.

405. The radio network control device determines uplink load state of the terminal.

The uplink load state of the terminal is determined as a first uplink load state if the radio network control device judges that the uplink load of the serving cell of the terminal is greater than a first uplink load threshold; or, the uplink load state of the terminal is determined as the first uplink load state if the radio network control device judges that the uplink load of at least one cell in the active set cells of the terminal is greater than the first uplink load threshold.

The first uplink load threshold is a threshold for determining whether the uplink load is restricted. When there are more users or uplink caches of partial terminals are sufficient, the radio network control device may consider that it is not possible for the terminal to increase speed in a longer subsequent time period (in other word, the uplink load is restricted); however, it is reasonable to adjust the power offset parameter configuration of the terminal as low-speed parameter configuration; because a load situation of the terminal may be fluctuated if the uplink load of the cell of the terminal is not restricted. In order to prevent the "Ping Pang" problem on adjusting the power offset parameter, that is, to frequently switch the power offset parameter, the embodiment of the present invention may not adjust the power offset parameter configuration as low-speed parameter configuration in the case that the uplink load is not restricted.

In practical application, a relative threshold (for example, 90%) is set for the uplink load threshold, and an absolute load threshold is 75%×90%=67.5% (assume that a target value of the uplink load is 75%). Generally, the speed of the terminal is still possible to increase if the uplink load is not restricted. At this moment, adjusting from high-speed parameter configuration to low-speed parameter configuration is not implemented even if the current throughput rate meets a low threshold so as to prevent "Ping Pang" problem caused by fluctuation of the throughput rate.

406. The radio network control device determines and sets the power offset parameter configuration corresponding to the resource state.

The radio network control device determines the power offset parameter configuration corresponding to the resource state according to the determined throughput rate state and uplink load state.

In the embodiment of the present invention, the uplink load state may be integrally considered when determining the power offset parameter configuration. If the data throughput rate belongs to the first throughput rate state and the uplink load of the terminal is restricted (in other word, the terminal is in the first uplink load state), it is not possible for the terminal to increase speed in a longer subsequent time period; however, it is reasonable to adjust the power offset parameter configuration of the terminal as low-speed parameter configuration at this moment. If the uplink load of the terminal is not restricted (in other word, the terminal is not in the first uplink load state), the corresponding power offset parameter configuration may not be set as low-speed parameter configuration even if the terminal is in the first throughput rate state.

Specifically, the power offset parameter configuration of the terminal is adjusted to make it be low-speed parameter configuration if the data throughput rate is in the first throughput rate state and the resource of the serving cell or the at least one cell in the active set cells of the terminal is in the first upload state. Specifically, the terminal may be configured with configuration capable of obtaining a lower reference power offset of the E-DPDCH relative to the DPCCH, or a lower HARQ PO parameter for each MAC-d flow to reduce unnecessary uplink DPCCH power load to the greatest extent in case of meeting multi-path search and channel estimation precision needed by low-speed data transmission, so that more uplink load is used for transmitting terminal data, and therefore obtaining optimal uplink low-speed data transmission performance. The current power offset parameter configuration is kept unchanged if the data throughput rate is in the first throughput rate state and the cell resource of the serving cell or at least one cell in the active set cells of the terminal is in a non-first uplink load state, or the data throughput rate is in the third throughput rate state. The power offset parameter configuration of the terminal is adjusted to make it be high-speed parameter configuration if the data throughput rate is in the second throughput rate state. Specifically, the terminal may be configured with configuration capable of obtaining a higher reference power offset of the E-DPDCH relative to the DPCCH, or a higher HARQ PO parameter for each MAC-d flow so as to obtain higher multi-path search and channel estimation precision, and therefore obtaining optimal uplink high-speed data transmission performance.

407. The radio network control device sends the power offset parameter configuration to the terminal.

The radio network control device sends the power offset parameter configuration to the terminal, so that the terminal determines the power offset parameter.

After determining the power offset parameter configuration currently adaptive to the terminal, the radio network control device needs to send the power offset parameter configuration to the terminal, so that the terminal may set the power offset parameter according to the power offset parameter configuration, thereby implementing data transmission according to the power offset parameter. For a specific way for setting the power offset parameter of the terminal, reference may be made to content described in step 304; and unnecessary details are not described here.

Figure 5:
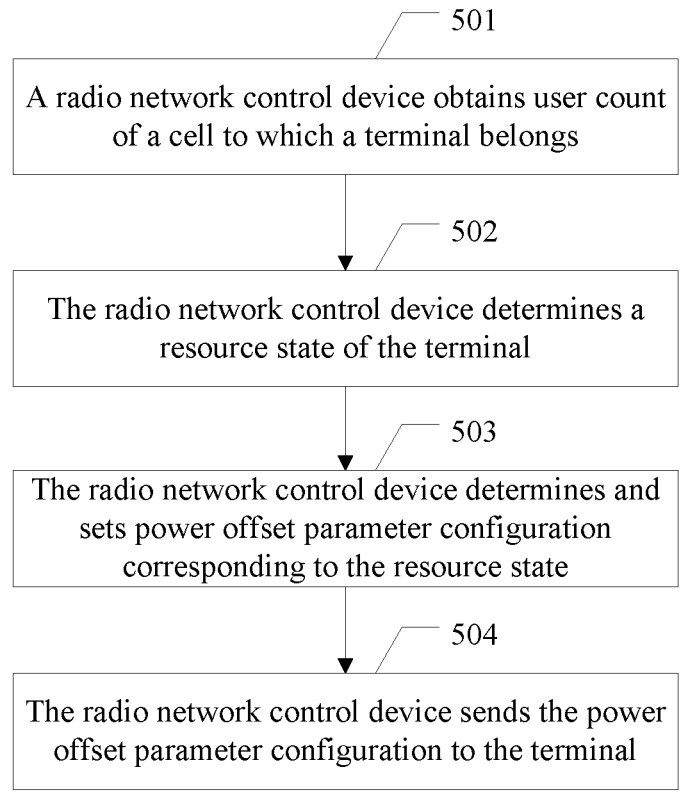
FIG. 5 is a schematic diagram of a method for determining a power offset parameter according to another embodiment of the present invention.

The following uses power offset parameter configuration of a terminal during initial access as an example and assumes that the terminal does not implement data transmission during the initial access, to illustrate a method for determining a power offset parameter of the present invention. Referring to FIG. 5, the method for determining the power offset parameter according to another embodiment of the present invention includes:

501. A radio network control device obtains user count of a serving cell or at least one cell in active set cells of a terminal.

The radio network control device obtains user count of a serving cell or at least one cell in active set cells. Optionally, the radio network control device may further obtain uplink load of the serving cell or the at least one cell in the active set cells. Because the methods for determining a resource state by the user count or the uplink load are similar, the embodiment of the present invention only illustrates the methods by using the user count as an example; and "the method for determining the resource state by the uplink load" is not described again.

In the embodiment of the present invention, because the terminal does not transmit data, data throughput rate of the terminal cannot be obtained.

502. The radio network control device determines a resource state of the terminal.

The radio network control device may determine the resource state of the terminal according to the user count and a preset user count threshold. At least one resource state is included.

Specifically, the radio network control device may set a user count threshold. When the user count obtained by the radio network control device is greater than or equal to a first user count threshold, the terminal is in a first user count state (in other word, one resource state therein). When the user count obtained by the radio network control device is smaller than or equal to a second user count threshold, the terminal is in a second user count state. Similar to the throughput rate state, more than two levels may be further set for the user count state, so that the power offset parameter configuration is more precise. However, if more user count states are set, speed smoothness may be affected; moreover, more air interface signalling reconfiguration may directly increase a call drop risk of the terminal.

503. The radio network control device determines and sets the power offset parameter configuration corresponding to the resource state.

The radio network control device determines the power offset parameter configuration corresponding to the user count state according to the determined user count state.

Specifically, the radio network control device determines the power offset parameter configuration corresponding to the user count state according to a determination result of the user count state. If the terminal is in the first user count state (that is, the number of accessed users is large), the radio network control device determines the power offset parameter configuration corresponding to the terminal as low-speed parameter configuration. If the terminal is in the second user count state (that is, the number of accessed users is small), the radio network control device determines the power offset parameter configuration corresponding to the terminal as high-speed parameter configuration.

After determining the power offset parameter configuration corresponding to the terminal, the radio network control device sets the power offset parameter of the terminal locally according to the power offset parameter configuration.

504. The radio network control device sends the power offset parameter configuration to the terminal.

The radio network control device sends the power offset parameter configuration to the terminal, so that the terminal determines the power offset parameter.

After determining the power offset parameter configuration currently adaptive to the terminal, the radio network control device needs to send the power offset parameter configuration to the terminal, so that the terminal may set the power offset parameter according to the power offset parameter configuration, thereby implementing data transmission according to the power offset parameter.

Figure 6:
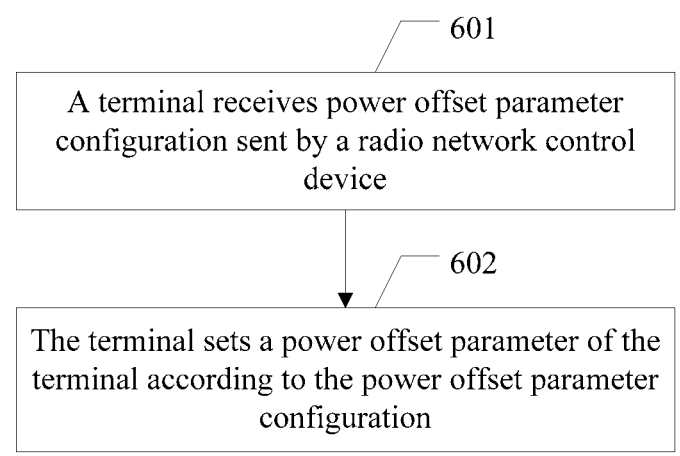
FIG. 6 is a schematic diagram of a method for determining a power offset parameter according to another embodiment of the present invention.

The method for determining the power offset parameter in the embodiment of the present invention is described above from an aspect of the radio network control device. The method for determining the power offset parameter in the embodiment of the present invention is described below from an aspect of the terminal. Referring to FIG. 6, a method for determining a power offset parameter according to another embodiment of the present invention includes:

601. A terminal receives power offset parameter configuration sent by a radio network control device.

The terminal receives the power offset parameter configuration sent by the radio network control device, where the power offset parameter configuration is determined by the radio network control device according to data throughput rate and/or cell resource usage state of the terminal, and a corresponding threshold.

Optionally, the cell resource usage state may be user count or uplink load of at least one cell in serving cells of the terminal, and/or, uplink load or user count of at least one cell in active set cells of the terminal.

Specifically, after the radio network control device determines the power offset parameter configuration currently adaptive to the terminal, the radio network control device may send the power offset parameter configuration to the terminal, so that the terminal may set the power offset parameter according to the power offset parameter configuration, thereby implementing data transmission according to the power offset parameter.

Specific content of the power offset parameter configuration may include: such parameters as a reference E-TFCI and a reference power offset, and/or an HARQ PO for each MAC-d flow, and the like. Moreover, the power offset parameter configuration may include specific parameter content and relevant configuration (for example, E-TFCI and reference power offset), and may be further a policy of a set of configuration (for example, keeping the current parameter unchanged). A specific realization mode of the power offset parameter configuration may be decided according to practical situations and is not limited here.

602. The terminal sets the power offset parameter of the terminal according to the power offset parameter configuration.

The terminal sets the power offset parameter of the terminal according to the power offset parameter configuration. Specifically, the method for setting the power offset parameter may be decided according to content of the power offset parameter configuration; for example:

if the power offset parameter configuration is a policy of a set of configuration such as keeping the current parameter unchanged, the terminal does not need to modify the current power offset parameter; if the power offset parameter configuration is a specific parameter content (for example, the E-TFCI and the reference power offset) and configuration of the parameter content, the terminal may set the parameter according to the parameter content in the power offset parameter configuration, specifically:

(1) Configuration of a reference E-TFCI and a reference power offset may be unchanged, and configuration of an HARQ PO may be adjusted; for example, the HARQ PO is configured as 5 dB in low-speed parameter configuration; and the HARQ PO is configured as 0 dB in high-speed parameter configuration.

(2) Or, the HARQ PO may be unchanged, and the configuration of the reference E-TFCI and the reference PO may be adjusted; for example, the HARQ PO is always set as 0 dB; however, in the high-speed parameter configuration, the reference E-TFCI and the reference PO are:

| Reference E-TFCI | Reference PO |
|---|---|
| 1 | 11 |
| 3 | 13 |
| ... | ... |

The configuration of the E-TFCI and the reference PO may be configuration with only one group of numbers such as "1" and "11", and may be further configuration with a plurality of groups of numbers which are represented by ellipsis here and is not described again.

However, the configuration of the E-TFCI and the reference PO in the low-speed parameter configuration is:

| Reference E-TFCI | Reference PO |
|---|---|
| 1 | 16 |
| 3 | 18 |
| ... | ... |

(3) All the configuration of the reference E-TFCI, the reference PO and the HARQ PO may be adjusted. Assume that initial configuration of (1) and (2) is high-speed parameter configuration, then the reference E-TFCI and the reference PO in the low-speed parameter configuration are:

| Reference E-TFCI | Reference PO |
|---|---|
| 1 | 16 |
| 3 | 18 |
| ... | ... |

Moreover, HARQ PO=3 dB.

Figure 7:
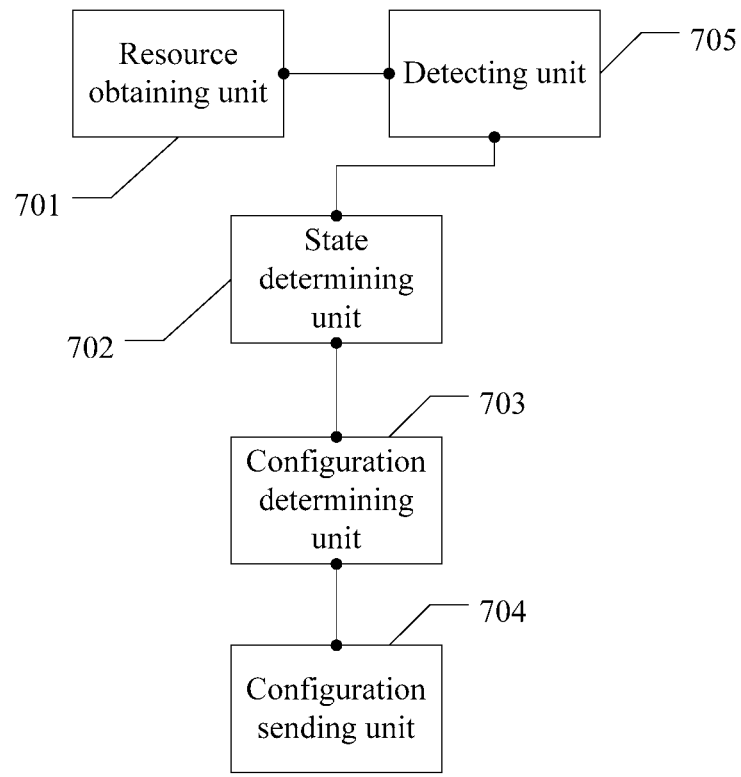
FIG. 7 is a schematic structural diagram of a radio network control device according to the present invention.

The radio network control device configured to dynamically adjust the power offset parameter according to the embodiment of the present invention is illustrated below. For a logical structure of the radio network control device, reference may be made to FIG. 7. A radio network control device according to one embodiment of the present invention includes:

a resource obtaining unit 701, configured to obtain data throughput rate and/or cell resource usage state of a terminal;

a state determining unit 702, configured to determine the resource state of the terminal according to the data throughput rate and/or the cell resource usage state, and a corresponding threshold;

a configuration determining unit 703, configured to determine the power offset parameter configuration corresponding to the resource state according to the determined resource state; and a configuration sending unit 704, configured to send the power offset parameter configuration to the terminal, so that the terminal determines the power offset parameter according to the power offset parameter configuration.

The radio network control device in the embodiment of the present invention may further include:

a detecting unit 705, configured to detect whether the data throughput rate on a data channel is changed and trigger the state determining unit if the data throughput rate is changed.

Optionally, the radio network control device further includes a parameter setting unit, configured to set a reference E-TFCI and a reference power offset according to the determined power offset parameter configuration; or, set an HARQ PO for each MAC-d flow according to the determined power offset parameter configuration; or, set the reference E-TFCI, the reference power offset and the HARQ PO for each MAC-d flow according to the determined power offset parameter configuration.

The state determining unit 702 in the embodiment of the present invention may include:

a first state determining module, configured to determine a throughput rate state of the terminal according to the data throughput rate and a corresponding throughput rate threshold; wherein the throughput rate state comprises at least one of a first throughput rate state and a second throughput rate state, where the first throughput rate state indicates that the data throughput rate is greater than or equal to a first throughput rate threshold, the second throughput rate state indicates that the data throughput rate is smaller than or equal to a second throughput rate threshold, and the first throughput rate threshold is greater than or equal to the second throughput rate threshold; and/or a second state determining module, configured to determine a user count state or an uplink load state according to the cell resource usage state and a corresponding threshold; wherein the user count state comprises at least one of a first user count state and a second user count state, where the first user count state indicates that a user count is greater than or equal to a first user count threshold, the second user count state indicates that a user count is smaller than or equal to a second user count threshold, and the first user count threshold is greater than or equal to the second user count threshold; and the uplink load state includes at least one of the first uplink load state and the second uplink load state, where the first uplink load state indicates that uplink load is greater than or equal to a first uplink load threshold, the second uplink load state indicates that the uplink load is smaller than or equal to a second uplink load threshold, and the first uplink load threshold is greater than or equal to the second uplink load threshold.

The configuration determining unit 703 in the embodiment of the present invention may include:

a first configuration determining module, configured to determine the power offset parameter configuration as low-speed parameter configuration if the data throughput rate of the terminal is in the first throughput rate state, where the low-speed parameter configuration is power parameter configuration with a lower data transmission rate, a greater search path and a higher channel estimation precision; or, configured to determine the power offset parameter configuration as high-speed parameter configuration if the data throughput rate of the terminal is in the second throughput rate state, where the high-speed parameter configuration is power parameter configuration with a higher data transmission rate, a smaller search path and a lower channel estimation precision;

and/or, a second configuration determining module, configured to determine the power offset parameter configuration as low-speed parameter configuration if a cell resource of a serving cell or at least one cell in active set cells of the terminal is in the first user count state or the first uplink load state; or, determine the power offset parameter configuration as high-speed parameter configuration if a cell resource of a serving cell of the terminal is in the second user count state or the second uplink load state;

and/or, a third configuration determining module, configured to determine the power offset parameter configuration as low-speed parameter configuration if the throughput rate of the terminal is in the second throughput rate state and a cell resource of a serving cell or at least one cell in active set cells of the terminal is in the first uplink load state.

A specific interactive process of each unit in the radio network control device in the embodiment of the present invention is as follows:

the resource obtaining unit 701 of the radio network control device obtains the cell resource usage state of the terminal on the data channel (optionally, the data channel may be an E-DPDCH).

In practical application, the radio network control device in the embodiment of the present invention may be an RNC or an evolved NodeB, and is not limited here. Optionally, the cell resource usage state may be user count, uplink load or data throughput rate of a serving cell or a cell in active set cells of the terminal. Specifically, the cell resource usage state is the user count or the uplink load of the cell if the terminal is in an initial access state (in other word, no data usage is generated); and the cell resource usage state is the user count, the uplink load or the data throughput rate if the terminal is in a data transmission state (in other word, data usage is generated). If the cell resource usage state is the data throughput rate, the radio network control device may perform entity detection on the data usage of the terminal on the E-DPDCH by its own RLC and calculate the data throughput rate of the terminal on the data channel according to the data usage.

Optionally, the detecting unit 706 may detect whether the data throughput rate of the terminal on the data channel is changed before the state determining unit 702 performs operations. Specifically, the detecting unit 706 may in real time detect whether the data throughput rate of the current time period is changed when comparing the data throughput rate with that of a previous time period; if the data throughput rate is changed, the state determining unit 702 is triggered and a process for adjusting the power offset parameter is continuously performed; if the data throughput rate is not changed, a process for setting the power offset parameter is stopped.

The state determining unit 702 determines the resource state of the terminal according to the cell resource usage state and the preset threshold.

Specifically, the preset threshold is decided according to the obtained cell resource usage state. If the cell resource usage state is the user count of the cell, the preset threshold is a user count threshold; if the cell resource usage state is the uplink load of the cell, the preset threshold is a uplink load threshold; and if the cell resource usage state is the data throughput rate of the cell, the preset threshold is a throughput rate threshold. No matter to which types the cell resource usage state and the preset threshold belong, the resource state includes at least one type and the at least one type of resource state is corresponding to power offset parameter configuration of at least one level, respectively, so that the radio network control device selects power offset parameter configuration adaptive to the current resource state of the cell to implement data transmission.

Optionally, the resource state may be shown as a throughput rate state in a scenario where data transmission has occurred; moreover, there is at least one throughput rate state. For example, one throughput rate threshold (in other word, the preset threshold) may be set and two throughput rate states may be set if impacts on the terminal caused by frequently adjusting power offset parameter configuration are not considered. If it needs to prevent frequent adjustments on the power offset parameter configuration, two throughput rate thresholds may be set; that is, there are three throughput rate states; therefore, the data throughput rate of the terminal on the data channel may have a reciprocating buffer zone; that is, the current power offset parameter configuration may not be adjusted when the data throughput rate is in a middle throughput rate state. Specifically, the throughput rate state includes a first throughput rate state, a second throughput rate state and a third throughput rate state, where the data throughput rate greater than or equal to a first throughput rate threshold belongs to the first throughput rate state; the data throughput rate between the first throughput rate threshold and a second throughput rate threshold (in other word, a threshold smaller than the first throughput rate threshold and greater than the second throughput rate threshold) belongs to the third throughput rate state; the data throughput rate smaller than or equal to the second throughput rate threshold belongs to the second throughput rate state; and the first throughput rate threshold is greater than the second throughput rate threshold. In the embodiment of the present invention, each throughput rate state may be preset with corresponding power offset parameter configuration. Optionally, more throughput rate states may be preset for the terminal. That is, multi-level power offset parameter configuration may be set; so that the power offset parameter configuration is more precise. However, on the contrary, speed smoothness may be affected if more throughput rate states are set; moreover, more air interface signalling reconfigurations may directly increase call drop risk of the terminal.

Optionally, the resource state of the terminal may be determined by the radio network control device according to the cell resource usage state if the terminal is in a scenario of initial access. The cell resource usage state may be uplink load or user count of a serving cell or a cell in active set cells of the terminal. Specifically, the radio network control device may determine the user count state or the uplink load state according to the cell resource usage state and a corresponding threshold. The user count state includes at least one of the first user count state and the second user count state. The first user count state indicates that the user count is greater than or equal to the first user count threshold. The second user count state indicates that the user count is less or equal to the second user count threshold. The first user count threshold is greater than or equal to the second user count threshold.

The uplink load state includes at least one of the first uplink load state and the second uplink load state. The first uplink load state indicates that the uplink load is greater than or equal to the first uplink load threshold. The second uplink load state indicates that the uplink load is less or equal to the second uplink load threshold. The first uplink load threshold is greater than or equal to the second uplink load threshold.

After determining the resource state of the terminal, the configuration determining unit 703 determines the power offset parameter configuration corresponding to the resource state according to the determined resource state.

Specifically, the configuration determining unit 703 determines the power offset parameter configuration corresponding to the throughput rate state according to the determination result of the throughput rate state in a scenario that data transmission has occurred. In the embodiment of the present invention, each throughput state is preset with corresponding power offset parameter configuration, where the power offset parameter configuration may include specific parameter content and relevant configuration (for example, the E-TFCI and the reference power offset), or may include a policy of a set of configuration (for example, keeping the current parameter unchanged). Like the first throughput rate state, the values of the data throughput rate in the first throughput rate state are all higher throughput rate. If the data throughput rate of the terminal on the data channel is in the first throughput rate state, configuration capable of obtaining lower power offset parameter (the power offset is in inverse proportion to the DPCCH) may be configured for the terminal, so that the terminal may obtain higher multi-path search and channel estimation precision, and therefore obtaining optimal uplink high-speed data transmission performance.

Optionally, three throughput rate states and power offset parameter configuration at two levels (high-speed parameter configuration and low-speed parameter configuration) may be set in the embodiment of the present invention in view of impacts on the transmission speed of the terminal, where the three throughput rate states are the first throughput rate state, the second throughput rate state and the third throughput rate state, respectively; where the data throughput rate greater than or equal to the first throughput rate threshold is in the first throughput rate state; the data throughput rate between the first throughput rate threshold and the second throughput rate threshold (that is, a threshold smaller than the first throughput rate threshold and greater than the second throughput rate threshold) is in the third throughput rate state; and the data throughput rate smaller than or equal to the second throughput rate threshold is in the second throughput rate state.

In the embodiment of the present invention, the uplink load state may be integrally considered when determining the power offset parameter configuration. If the uplink load of the terminal is restricted (in other word, the terminal is in the first uplink load state), it is not possible for the terminal to increase speed in a longer subsequent time period; however, it is reasonable to adjust the power offset parameter configuration of the terminal as low-speed parameter configuration at this moment. If the uplink load of the terminal is not restricted (in other word, the terminal is not in the first uplink load state), the corresponding power offset parameter configuration may not be set as low-speed parameter configuration even if the terminal is in the first throughput rate state.

Specifically, the power offset parameter configuration of the terminal may be adjusted to make it be low-speed parameter configuration if the data throughput rate is in the first throughput rate state and the cell resource of the serving cell or the at least one cell in the active set cells of the terminal is in the first upload state. Specifically, the terminal may be configured with configuration capable of obtaining a lower power offset of the E-DPDCH relative to the DPCCH, or a lower HARQ PO parameter for each MAC-d flow to reduce unnecessary uplink DPCCH power load to the greatest extent in case of meeting multi-path search and channel estimation precision needed by low-speed data transmission, so that more uplink load is used for transmitting terminal data, and therefore obtaining optimal uplink low-speed data transmission performance. The current power offset parameter configuration is kept unchanged if the data throughput rate is in the first throughput rate state and the cell resource of the serving cell or the at least one cell in the active set cells of the terminal is in a non-first uplink load state, or the data throughput rate is in the third throughput rate state. The power offset parameter configuration of the terminal is adjusted to make it be high-speed parameter configuration if the data throughput rate is in the second throughput rate state. Specifically, the terminal may be configured with configuration capable of obtaining a higher power offset of the E-DPDCH relative to the DPCCH, or higher HARQ PO parameter for each MAC-d flow so as to obtain higher multi-path search and channel estimation precision, and therefore obtaining optimal uplink high-speed data transmission performance.

Optionally, the configuration determining unit 703 determines the power offset parameter configuration corresponding to the user count state according to the determination result of the user count state if the terminal is in an initial access scenario; the radio network control device determines the power offset parameter configuration corresponding to the terminal as low-speed parameter configuration if the terminal is in the first user state (in other word the user count accessed is more); and the radio network control device determines the power offset parameter configuration corresponding to the terminal as high-speed parameter configuration if the terminal is in the second user state (in other word, the user count accessed is less).

Optionally, if the resource state of the terminal is determined according to the uplink load, the power offset parameter configuration is determined as low-speed parameter configuration if the cell resource of the serving cell or the at least one cell in the active set cells of the terminal is in the first uplink load state. Or, the power offset parameter configuration is determined as high-speed parameter configuration if the cell resource of the serving cell of the terminal is the second uplink load state.

After determining the power offset parameter configuration corresponding to the terminal, the configuration sending unit 704 sends the power offset parameter configuration to the terminal, so that the terminal may set the power offset parameter according to the power offset parameter configuration, thereby implementing data transmission according to the power offset parameter.

Figure 8:
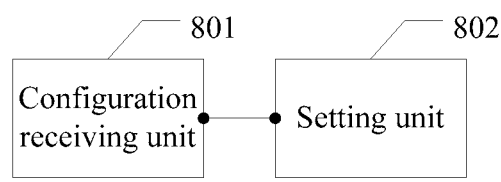
FIG. 8 is a schematic structural diagram of a terminal according to the present invention.

The terminal configured to dynamically adjust the power offset parameter in the embodiment of the present invention is illustrated below. For a logical structure of the terminal, reference may be made to FIG. 8. A terminal according to one embodiment of the present invention includes:

a configuration receiving unit 801, configured to receive power offset parameter configuration sent by a radio network control device, where the power offset parameter configuration is determined by the radio network control device according to cell resource usage state of the terminal on a data channel, and a corresponding threshold; and a setting unit 802, configured to set the power offset parameter of the terminal according to the power offset parameter configuration. Optionally, the setting unit 802 may include:

a first setting module, configured to set a reference E-TFCI and a reference power offset according to the determined power offset parameter configuration;

and/or, a second setting module, configured to set an HARQ PO for each MAC-d flow according to the determined power offset parameter configuration.

Specific performing processes of each unit in the terminal of the embodiment of the present invention are as follows:

the configuration receiving unit 801 of the terminal receives the power offset parameter configuration sent by the radio network control device, where the power offset parameter configuration is determined by the radio network control device according to data throughput rate and/or cell resource usage state of the terminal, and a corresponding threshold. Optionally, the cell resource usage state includes uplink load or user count of at least one cell in serving cells of the terminal, and/or, the uplink load or user count of at least one cell in active set cells of the terminal.

Specifically, after determining the power offset parameter configuration of the terminal, the radio network control device needs to send the power offset parameter configuration to the terminal, so that the terminal may set the power offset parameter according to the power offset parameter configuration, thereby implementing data transmission according to the power offset parameter. Specific content of the power offset parameter configuration may include: such parameter as a reference E-TFCI and a reference power offset, and/or an HARQ PO for each MAC-d flow, and the like. Moreover, the power offset parameter configuration may include specific parameter content and relevant configuration (for example, the E-TFCI and the reference power offset), and may be further a policy of a set of configuration (for example, keeping the current parameter unchanged). A specific realization mode of the power offset parameter configuration may be decided according to practical situations and is not limited here.

After obtaining the power offset parameter configuration, the setting unit 802 sets the power offset parameter of the terminal according to the power offset parameter configuration. Specifically, the method for setting the power offset parameter needs to be determined according to the content of the power offset parameter configuration. For example:

if the power offset parameter configuration is the policy of a set of configuration, for example, keeping the current parameter unchanged, the terminal does not need to modify the current power offset parameter; if the power offset parameter configuration is the specific parameter content and relevant configuration, the terminal needs to set according to the parameter content in the power offset parameter configuration, specifically:

(1) configuration of a reference E-TFCI and a reference power offset may be unchanged, and configuration of an HARQ PO may be adjusted; for example, the HARQ PO is configured as 5 dB in low-speed parameter configuration; and the HARQ PO is configured as 0 dB in high-speed parameter configuration;

(2) Or, the HARQ PO may be unchanged, and the configuration of the reference E-TFCI and the reference PO may be adjusted; for example, the HARQ PO is always set as 0 dB; however, in the high-speed parameter configuration, the reference E-TFCI and the reference PO are:

| Reference E-TFCI | Reference PO |
|---|---|
| 1 | 11 |
| 3 | 13 |
| ... | ... |

The configuration of the E-TFCI and the reference PO may be configuration with only one group of numbers such as "1" and "11", and may be further configuration with a plurality of groups of numbers which are represented by ellipsis here and is not described again.

However, the configuration of the E-TFCI and the reference PO in the low-speed parameter configuration is:

| Reference E-TFCI | Reference PO |
|---|---|
| 1 | 16 |
| 3 | 18 |
| ... | ... |

(3) All the configuration of the reference E-TFCI, the reference PO and the HARQ PO may be adjusted. Assume that initial configuration of (1) and (2) is high-speed parameter configuration, then the reference E-TFCI and the reference PO in the low-speed parameter configuration are:

| Reference E-TFCI | Reference PO |
|---|---|
| 1 | 16 |
| 3 | 18 |
| ... | ... |

Moreover, HARQ PO=3 dB.

In the several embodiments provided in the present application, it should be understood that the disclosed apparatuses and methods may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of steps of the methods described in the embodiments of the present invention. The storage medium includes: any medium that may store program code, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for determining a power offset parameter, the method comprising:

obtaining a user count of a serving cell of a terminal;

determining a user count state according to the user count and a corresponding threshold, wherein the user count state comprises at least one of a first user count state and a second user count state, wherein the first user count state indicates that the user count is greater than or equal to a first user count threshold, the second user count state indicates that the user count is smaller than or equal to a second user count threshold, and the first user count threshold is greater than or equal to the second user count threshold;

when the user count state is in the first user count state, determining a power offset parameter configuration as low-speed parameter configuration; and sending the power offset parameter configuration to the terminal, to enable the terminal to determine the power offset parameter according to the power offset parameter configuration.

2. The method according to claim 1, wherein the low-speed parameter configuration is power parameter configuration with (a) a data transmission rate lower than a data transmission rate threshold, (b) a search path whose number is greater than a search path threshold and (c) channel estimation precision greater than a channel estimation precision threshold.

3. The method according to claim 1, wherein the method further comprises:
when the user count state is in the second user count state, determining the power offset parameter configuration as high-speed parameter configuration.

4. The method according to claim 3, wherein the high-speed parameter configuration is power parameter configuration with (a) a data transmission rate higher than a data transmission rate threshold, (b) a search path whose number is smaller than a search path threshold and (c) channel estimation precision greater than a channel estimation precision threshold.

5. The method according to claim 1, wherein the power offset parameter configuration comprises at least one of the following:
(a) a reference E-DCH transport format combination indicator (E-TFCI) and a reference power offset, and
(b) a hybrid automatic repeat request power offset (HARQ PO) of each media access control (MAC)-d flow.

6. A radio network control device, comprising a processor, and a non-transitory processor-readable medium having processor-executable instructions stored thereon, which when executed causes the processor to:
obtain a user count of a serving cell of a terminal;
determine a user count state according to the user count and a corresponding threshold, wherein the user count state comprises at least one of a first user count state and a second user count state, wherein the first user count state indicates that the user count is greater than or equal to a first user count threshold, the second user count state indicates that the user count is smaller than or equal to a second user count threshold, and the first user count threshold is greater than or equal to the second user count threshold;
when the user count state is in the first user count state, determine a power offset parameter configuration as low-speed parameter configuration; and send the power offset parameter configuration to the terminal, to enable the terminal to determine the power offset parameter according to the power offset parameter configuration.

7. The radio network control device according to claim 6, wherein the low-speed parameter configuration is power parameter configuration with (a) a data transmission rate lower than a data transmission rate threshold, (b) a search path whose number is greater than a search path threshold and (c) channel estimation precision greater than a channel estimation precision threshold.

8. The radio network control device according to claim 6, wherein the processor is further configured to:
when the user count state is in the second user count state, determine the power offset parameter configuration as high-speed parameter configuration.

9. The radio network control device according to claim 8, wherein the high-speed parameter configuration is power parameter configuration with (a) a data transmission rate higher than a data transmission rate threshold, (b) a search path whose number is smaller than a search path threshold and (c) channel estimation precision greater than a channel estimation precision threshold.

10. The radio network control device according to claim 6, wherein the power offset parameter configuration comprises at least one of the following:
(a) a reference E-DCH transport format combination indicator (E-TFCI) and a reference power offset, and
(b) a hybrid automatic repeat request power offset (HARQ PO) of each media access control (MAC)-d flow.

11. A system comprising a radio network control device and a terminal, wherein:
the radio network control device is configured to obtain a user count of a serving cell of the terminal, determine a user count state according to the user count and a corresponding threshold, wherein the user count state comprises at least one of a first user count state and a second user count state, wherein the first user count state indicates that the user count is greater than or equal to a first user count threshold, the second user count state indicates that the user count is smaller than or equal to a second user count threshold, and the first user count threshold is greater than or equal to the second user count threshold; when the user count state is in the first user count state, determine a power offset parameter configuration as low-speed parameter configuration; and send the power offset parameter configuration to the terminal; and,
the terminal is configured to receive the power offset parameter configuration sent by the radio network control device, and set a power offset parameter of the terminal according to the power offset parameter configuration.

12. The system according to claim 11, wherein the low-speed parameter configuration is power parameter configuration with (a) a data transmission rate lower than a data transmission rate threshold, (b) a search path whose number is greater than a search path threshold and (c) channel estimation precision greater than a channel estimation precision threshold.

13. The system according to claim 11, wherein the radio network control device is further configured to:
when the user count state is in the second user count state, determine the power offset parameter configuration as high-speed parameter configuration.

14. The system according to claim 13, wherein the high-speed parameter configuration is power parameter configuration with (a) a data transmission rate higher than a data transmission rate threshold, (b) a search path whose number is smaller than a search path threshold and (c) channel estimation precision greater than a channel estimation precision threshold.

15. The system according to claim 11, wherein the power offset parameter configuration comprises at least one of the following:
(a) a reference E-DCH transport format combination indicator (E-TFCI) and a reference power offset, and
(b) a hybrid automatic repeat request power offset (HARQ PO) of each media access control (MAC)-d flow.

* * * * *